United States Patent [19]
Sabzevari

[11] Patent Number: 6,058,120
[45] Date of Patent: May 2, 2000

[54] SYSTEM AND APPARATUS FOR CONTROLLING TELECOMMUNICATIONS COMPONENTS

[75] Inventor: Nader Sabzevari, Plano, Tex.

[73] Assignee: Alcatel USA Sourcing, L.P., Plano, Tex.

[21] Appl. No.: 08/940,369

[22] Filed: Sep. 30, 1997

[51] Int. Cl.$^7$ .................................. H04J 3/16; H04J 3/02
[52] U.S. Cl. ............................................ 370/466; 370/539
[58] Field of Search .................................... 370/356, 358, 370/365, 367, 386, 389, 388, 437, 465, 524, 539, 541, 545, 907

[56] References Cited

U.S. PATENT DOCUMENTS

| | | | |
|---|---|---|---|
| 5,040,170 | 8/1991 | Upp et al. ................................ | 370/358 |
| 5,105,420 | 4/1992 | Ardon et al. ............................ | 370/216 |
| 5,115,425 | 5/1992 | Ardon ..................................... | 370/217 |
| 5,436,890 | 7/1995 | Read et al. .............................. | 370/220 |
| 5,623,491 | 4/1997 | Skoog ..................................... | 370/397 |
| 5,784,377 | 7/1998 | Baydar ................................... | 370/463 |

*Primary Examiner*—Chau Nguyen
*Assistant Examiner*—Chiho Andrew Lee
*Attorney, Agent, or Firm*—Baker Botts L.L.P.

[57] ABSTRACT

A system for controlling a telecommunications component is provided. The system includes a first data format transceiver resource object that contains data related to a first data format transceiver. The first data format transceiver converts data from a first data format to a second data format. The system further includes a second data format transceiver resource object that contains data related to a second data format transceiver. The second data format transceiver converts data from a third data format to the second data format. In addition, the system includes a controller coupled to the first data format transceiver resource object and the second data format transceiver resource object. The controller changes the data of the first data format transceiver resource object and the data of the second data format transceiver resource object.

30 Claims, 5 Drawing Sheets

6,058,120

SYSTEM AND APPARATUS FOR CONTROLLING TELECOMMUNICATIONS COMPONENTS

TECHNICAL FIELD OF THE INVENTION

The present invention relates in general to telecommunications data switching and more particularly to a system and apparatus for controlling telecommunications components.

BACKGROUND OF THE INVENTION

Modern telecommunications systems typically utilize digitally encoded data instead of analog data. If analog data is used, it may be converted to digital data for the purposes of switching the data between conducting media. Switching of data occurs at large telecommunications switches, which may receive and process hundreds or thousands of data channels carrying voice data, computer data files, computer data communications, facsimile data transmissions, or other suitable data.

Large telecommunications switches are typically comprised of many discrete components. The large number of data channels that are received and processed by the discrete components of a telecommunications switch must be precisely controlled to prevent the data contained within the data channels from being corrupted and lost. The discrete components must likewise be precisely controlled and coordinated with the telecommunications channels to prevent the data contained within the data channels from being corrupted and lost.

Known systems for controlling telecommunications components are typically limited in capability by such features as processing speed and software design. These limitations prevent such known controllers from being used in applications involving the switching of large amounts of data that is being transmitted at high speeds.

SUMMARY OF THE INVENTION

Therefore, a need has arisen for a system and apparatus for controlling telecommunications components that may be used in applications involving the switching of large amounts of data that is being transmitted at high speeds.

In accordance with the present invention, a system and apparatus for controlling telecommunications components is provided that substantially eliminates or reduces disadvantages and problems associated with previously developed telecommunications component controllers.

One aspect of the present invention is a system for controlling a telecommunications component. The system includes a first data format transceiver resource object that contains data related to a first data format transceiver. The first data format transceiver converts data from a first data format to a second data format. The system further includes a second data format transceiver resource object that contains data related to a second data format transceiver. The second data format transceiver converts data from a third data format to the second data format. In addition, the system includes a controller coupled to the first data format transceiver resource object and the second data format transceiver resource object. The controller changes the data of the first data format transceiver resource object and the data of the second data format transceiver resource object.

The present invention provides many important technical advantages. One important technical advantage of the present invention is a system for controlling a telecommunications system component that increases the speed and reliability of control for the component, and which also decreases the hardware density.

Another important technical advantage of the present invention is a method for controlling a telecommunications system component that increases the speed and reliability of control for the component.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Preferred embodiments of the present invention are illustrated in the figures, like numbers being used to refer to like and corresponding parts of the various drawings.

Figure 1:
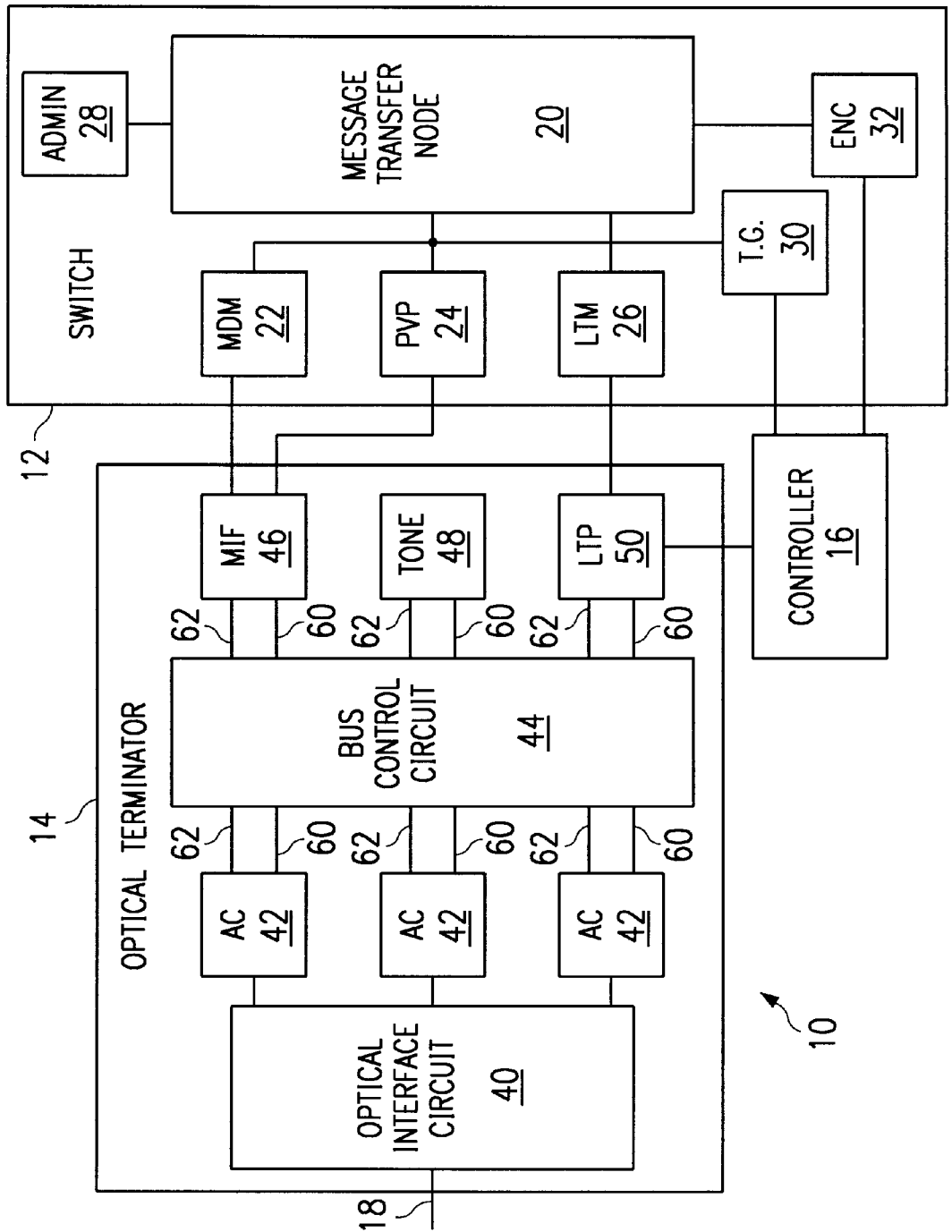
FIG. 1 illustrates a fiber optic termination module for a telecommunications switch embodying concepts of the present invention.

FIG. 1 is a system diagram of optical fiber-capable telecommunications switch system 10. Optical fiber-capable telecommunications switch system 10 includes switch 12 connected to fiber optic connection unit 14 and common controller 16. Optical telecommunications data channels, such as a stream of bit-serial date, byte-serial data, or serial frames of data, are received over one or more optical fibers 18 at fiber optic connection unit 14. These telecommunications data channels are converted to electrical signals by fiber optic connection unit 14 and are transmitted to switch 12 for switching between data channels. Switch 12 may switch data channels of any suitable size, such as DS0, DS1, DS3, or other suitable channels. Common controller 16 receives control data from and transmits control data to fiber optic connection unit 14 and switch 12.

Switch 12 is a telecommunications switch having M input channels and N output channels, where M and N are integers. Switch 12 receives telecommunications data at any of the M input channels and to transfer the telecommunications data to any of the N output channels. Switch 12, as shown in FIG. 1, is a digital switch, but may also be an analog switch. Switch 12 may include, for example, a Megahub 600E Digital Telecommunications Switch manufactured by DSC Communications Corporation of Plano, Tex. Switch 12 includes a message transport node 20 coupled to a matrix data multiplexer circuit (MDM) 22, a matrix control path verification processor (PVP) 24, a line trunk manager circuit (LTM) 26, administration circuit (ADMIN) 28, timing generator circuit (TG) 30, and Ethernet network circuit (ENC) 32.

Matrix data multiplexer circuit 22 is further coupled to matrix control path verification processor 24 and timing generator circuit 30. Matrix data multiplexer circuit 22 is an interface circuit that may be used for coupling data channels between fiber optic connection unit 14 and the switching matrix (not explicitly shown) of switch 12. In particular, matrix data multiplexer circuit 22 provides the interface for DS0 data. Matrix data multiplexer circuit 22 receives 2048 channels of DS0 data from fiber optic connection unit 14 on a 10-bit parallel data channel operating at a frequency of 16.384 MHZ. These DS0 data channels are then transmitted to the M input ports of the switching matrix of switch 12.

Control commands received at switch 12 from common controller 16 are used to determine the proper connections between the M input ports and the N output ports of the switching matrix. The DS0 data channels are transmitted through the switching matrix after the connections have been formed. The DS0 data channels received at matrix data multiplexer circuit 22 from the N output ports of the switching matrix are then transmitted back to fiber optic connection unit 14, or to another suitable data transmission medium.

Matrix control path verification processor 24 is coupled to fiber optic connection unit 14 and to message transport node 20. Matrix control path verification processor 24 is a switching matrix administration and control component that processes matrix channel low level fault detection and fault isolation data.

Line trunk manager circuit 26 is coupled to fiber optic connection unit 14 and message transport node 20. Line trunk manager circuit 26 is a switching matrix control component that receives and transmits data relating to call processing functions for fiber optic connection unit 14.

Timing generator circuit 30 is coupled to matrix data multiplexer circuit 22 and common controller 16. Timing generator circuit 30 is a switch timing circuit that receives timing data from an external source, such as fiber optic connection unit 14, and transmits the timing data to components of switch 12.

Ethernet network circuit 32 is coupled to message transport node 20 and common controller 16. Ethernet network circuit 32 is a data communications interface, and transfers data between message transport node 20 and common controller 16.

Fiber optic connection unit 14 includes an optical interface circuit 40, STSM application circuits (AC) 42, a bus control circuit 44, a matrix interface circuit (MIF) 46, a tone recognition circuit (TONE) 48, and a high speed line trunk processor circuit (LTP) 50. Fiber optic connection unit 14 receives digitally encoded optical data from optical fiber 18, performs broadcast switching of the data channels received from optical fiber 18, transmits synchronous transfer mode (STM) telecommunication data to matrix data multiplexer circuit 22 and matrix control path verification processor 24 for switching through the switching matrix of switch 12, and receives the switched telecommunications data from switch 12 for transmission over optical fiber 18.

Optical interface circuit 40 is capable of terminating optical signals, for example OC-3, connected to the public switched network (PSN). Optical interface circuit 40 receives digitally encoded optical telecommunications data from optical fiber 18 and converts the optical signals into electrical signals, for example STS-1, for transmission to other components of fiber optic connection unit 14. Optical interface circuit 40 is coupled to optical fiber 18 and to application circuits 42. Optical interface circuit 40 may include a single circuit card with electronic circuit subcomponents (not explicitly shown) that have plug-in connectors to allow the card to be easily installed in a cabinet containing other component circuit cards of fiber optic connection unit 14. Alternatively, optical interface circuit 40 may include two or more circuit cards, or one or more discrete components on a circuit card.

Application circuits 42 are telecommunications data transmission system components which are coupled to bus control circuit 44. Each application circuit 42 may have a separate circuit card (not explicitly shown) with plug-in connectors in order to be easily installed in a rack containing fiber optic connection unit 14. Alternatively, application circuits 42 may include multiple circuit cards, or individual components on a single circuit card.

As shown in FIG. 1, application circuits 42 are configured to receive data from and transmit data to optical interface circuit 40. This data may comprise synchronous transfer mode telecommunications data. For example, application circuits 42 may receive a single STS-3 channel of data that includes a plurality of DS0 data channels, where each DS0 data channel is a continuous stream of data equal to 65,536 bits per second. This data would be received in a predetermined format that may include administration data, control data, routing data, and payload data. The administration data, control data, and routing data is used to separate the individual DS0 data channels within the STS-3 data channel, and the payload data comprises the actual data carried in each individual DS0 data channel.

Bus control circuit 44 may be coupled to a number of other application circuits with more specific functions, such as matrix interface circuit 46, tone recognition circuit 48, and high speed line trunk processor circuit 50. Nevertheless, the common characteristic of application circuits 42 is that they are operable to transmit data to bus control circuit 44 over ingress buses 60 and to receive data from bus control circuit 44 over egress buses 62.

Bus control circuit 44 receives telecommunications data from applications circuits 42 over ingress buses 60, multiplexes the data into a single broadcast data channel, and transmits the broadcast data channel over egress buses 62. In this manner, bus control circuit 44 also operates as a broadcast switching device. Each application circuit 42 receives the broadcast data channel containing data from other application circuits, and can then process the data or transfer the data back to optical interface circuit 40 for transmission on optical fiber 18 to the network. Bus control circuit 44 may be a separate circuit card with plug-in connectors in order to be easily used in a rack containing fiber optic connection unit 14. Alternatively, bus control circuit 44 may include multiple circuit cards, or individual components on a single circuit card.

Matrix interface circuit 46 provides the protocol and transport format conversion between fiber optic interface circuit 14 and switch 12. Matrix interface circuit 46 is an application circuit that is used to transmit data received from the broadcast data channel transmitted by bus control circuit 44 to switch 12. Matrix interface circuit 46 is coupled to bus control circuit 44, matrix data multiplexer circuit 22, and matrix control path verification processor 24. Matrix interface circuit 46 converts the data format of the broadcast data channel received from bus control circuit 44 and switch 12 into a data format that is compatible with switch 12 and bus control circuit 44, respectively. Matrix interface circuit 46 may be a separate circuit card with plug-in connectors in order to be easily used in a rack containing fiber optic connection unit 14. Alternatively, matrix interface circuit 46 may include multiple circuit cards, or individual components on a single circuit card.

Tone recognition circuit 48 is an application circuit that is coupled to bus control circuit 44 and performs tone recognition functions for fiber optic connection unit 14. One pair of tone recognition circuits 48 may be required for every 2016 matrix ports of switch 12. Tone recognition circuit 48 interfaces with the broadcast data channel and detects data representative of keypad tones on each DS0 channel that comprises the broadcast data channel, up to the maximum of 2016 DS0 data channels.

Tone recognition circuit 48 has an array of digital signal processor devices (not explicitly shown) that can be configured to provide tone detection and generation. Tone recognition circuit 48 may be a separate circuit card with plug-in connectors in order to be easily used in a rack containing fiber optic connection unit 14. Alternatively, tone recognition circuit 48 may include multiple circuit cards, or individual components on a single circuit card.

High speed line trunk processor circuit 50 is the primary shelf controller for all of the circuit cards in fiber optic connection unit 14 and provides the interface between fiber optic connection unit 14 and switch 12. High speed line trunk processor circuit 50 contains a microprocessor, a communications interface to all circuit cards of fiber optic connection unit 14, and a communications interface to line trunk manager circuit 26.

High speed line trunk processor circuit 50 may be embodied as a separate circuit card with plug-in connectors in order to be easily used in a rack containing fiber optic connection unit 14. Alternatively, high speed line trunk processor circuit 50 may be multiple circuit cards, or individual components on a single circuit card.

Ingress buses 60 are data buses that are operable to carry a data channel with a predetermined bit structure and at a predetermined frequency from an application card to bus control circuit 44. For example, each ingress bus 60 may comprise a single data channel with 8 parallel bits operating at a frequency of 25.92 MHZ. Other bit structures and frequencies may be used where suitable.

Egress buses 62 are data buses that are operable to carry a data channel with a predetermined bit structure and at a predetermined frequency to an application card from bus control circuit 44. For example, each egress bus 62 may comprise a single data channel with 16 parallel bits operating at a frequency of 51.84 MHZ. Other bit structures and frequencies may be used where suitable.

Common controller 16 is coupled to switch 12 and fiber optic connection unit 14. Common controller 16 is a processor that receives administration, control, and routing data from switch 12 and fiber optic connection unit 14, and generates administration, control and routing data that coordinates the operation of switch 12 and fiber optic connection unit 14. Common controller 16 may alternatively be incorporated within switch 12 or fiber optic connection unit 14.

In operation, telecommunications data from the network is transmitted via optical fiber 18 and received by fiber optic connection unit 14. This telecommunications data is then converted into electrical signals and transmitted through optical interface circuit 40 to application circuit 42 for broadcast switching through bus control circuit 44. The broadcast data is then switched back to application circuit 42 for retransmission through optical fiber 18 via optical interface circuit 40. The broadcast data may also or alternatively be transmitted to matrix interface circuit 46, tone recognition circuit 48, high speed line trunk processor circuit 50, or other suitable circuits to perform specific functions thereon.

Application circuits 42 are operable to receive the broadcast data and to selectively retransmit all or a portion of the data through optical interface circuit 40 to optical fiber 18. In this manner, switching of telecommunications data received from optical fiber 18 may be accomplished by bus control circuit 44 without the need for transmitting the data to switch 12 for switching.

Figure 2:
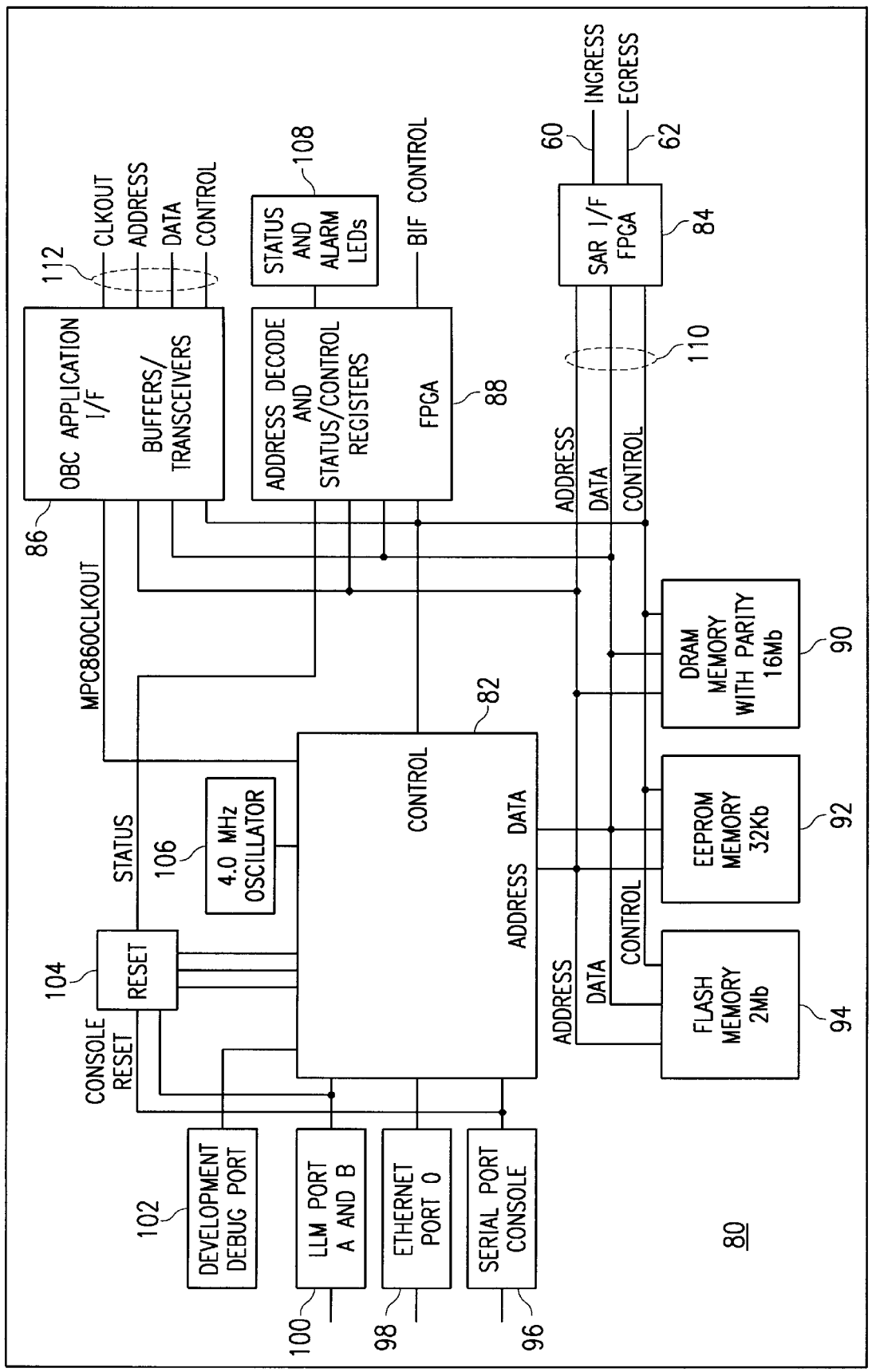
FIG. 2 is a block diagram of a processor for use in a telecommunications component controller embodying concepts of the present invention.

FIG. 2 is a block diagram of a processor 80 for use in a telecommunications component controller embodying concepts of the present invention. Processor 80 is operable to receive control data from egress bus 62 and to process the control data in accordance with software stored on memory devices of telecommunications component controller 80. Processor 80 is further operable to transmit control commands to an application card such as application card 40. Telecommunications component controller 80 may comprise a communication processor such as a Motorola MPC 860, available from Motorola Corporation.

Telecommunications component controller 80 comprises a telecommunications processor 82, which is coupled to ingress/egress bus interface 84 and application interface 86. Ingress/egress bus interface 84 may be physically located on a different circuit card from telecommunications component controller 80, or may alternatively be located on the same circuit card. Ingress/egress bus interface 84 is coupled to ingress bus 60 and egress; bus 62. Application interface 86 is coupled to an application card, such as an STS-1 interface card (not explicitly shown).

Telecommunications component controller 80 further comprises address decode and status control registers 88 and memory devices such as flash memory 94, erasable programmable read-only memory 92, and dynamic random access memory 90. External ports are also available on processor 82, such as maintenance port 100, ethernet port 98, and development debug port 102. Reset device 104 is coupled to processor 82 and is operable to control reset operations of processor 82. Other components of telecommunications component controller 80 include 4 MHZ oscillator 106 and status and alarm light emitting diodes 108.

Processor 82 is a telecommunications data processor such as a Motorola MPC 860 processor. Processor 82 includes time division multiplex access buses, ethernet ports, serial communications ports, and other data interface ports.

Processor 82 is operable to receive programming data and control data from ingress/egress interface 84. The programming data may be stored on a memory device such as dynamic random access memory 90 or on memory internal to processor 82 during operation. Control data received from ingress/egress interface 84 is processed by processor 82 in accordance with the programming data. The control data is then transmitted to an application circuit through application interface 86.

Dynamic random access memory 90 is a 16 megabit dynamic random access memory. Erasable programmable read-only memory 92 is a 32 kilobit erasable programmable read-only memory. Flash memory 94 is a 2 megabit flash memory. Dynamic random access memory 90, erasable programmable read-only memory 92, and flash memory 94 may comprise other suitable memory types and capacities. These memory devices are coupled to address and data buses 110. Data is transferred between processor 82, ingress/egress interface 84, application interface 86, and each of dynamic random access memory 90, erasable programmable read-only memory 92, and flash memory 94 via address and data buses 110.

Address and data buses 110 are data conductors that may be used to carry data between two or more devices. Address and data buses 110 comprise an address bus, a data bus, a control bus, and other suitable buses. In operation, one of the two or more devices coupled to address and data buses 110 may transmit data while each of the other devices may receive the transmitted data. The transmitted data may include address data over the address bus and payload data over the data bus. The control bus may be used to transmit controls from processor 82 to any of the devices coupled to address and data buses 110.

Serial port 96, ethernet port 98, maintenance port 100, and development debug port 102 are used to transfer data between processor 82 and an external source. For example, processor 82 may transmit data to and receive data from controller 16 of FIG. 1 via ethernet port 98 or maintenance port 100.

Address decode and status and control registers 88 store data address tables that may be used by processor 82 to store data received from ingress/egress interface 84 and application interface 86. Address decode and status control registers 88 may comprise a field programmable gate array or other suitable components. Address decode and status control registers 88 are coupled to processor 82 and status and alarm light emitting diodes 108.

Application interface 86 is coupled to processor 82 and an application circuit (not explicitly shown) via address and data buses 112. Application interface 86 comprises data buffers and data transceivers that are operable to transfer control data between processor 82 and the application circuit. Individual components (not explicitly shown) of the application circuit may also be coupled to address and data buses 112.

Address and data buses 112 are data conductors that may be used to carry data between two or more devices. Address and data buses 110 comprise a clock bus, an address bus, a data bus, a control bus, and other suitable buses. In operation, one of the two or more devices coupled to address and data buses 110 transmit data while one or more of the other devices receive the transmitted data. The transmitted data includes address data over the address bus and payload data over the data bus. The control bus is used to transmit controls from processor 82 to any of the devices coupled to address and data buses 110.

In operation, control data and operating programs are received by processor 82 via ingress/egress bus interface 84 from ingress bus 62. Operating programs are stored in suitable memory locations, such as dynamic random access memory 90, erasable programmable read-only memory 92, and flash memory 94, and are used by processor 82 to process control data subsequently received from egress bus 62. This control data is used to coordinate the function of the application circuit coupled to application interface 86.

For example, the application circuit controlled by telecommunications component controller 80 may be an STS-1 telecommunications channel control circuit. Telecommunications component controller 80 is further operable to receive control data from the application circuit through application interface 86, and to process the control data with processor 82. This data may then be transmitted over ingress/egress bus interface 84 to ingress bus 60.

Telecommunications component controller 80 may include programming instructions based on object-oriented programming languages or other suitable programming languages. Object oriented programming languages facilitate the use of telecommunications component controller 80 in a distributed processing environment, which may increase the speed and reliability of telecommunications component controller 80.

Figure 3:
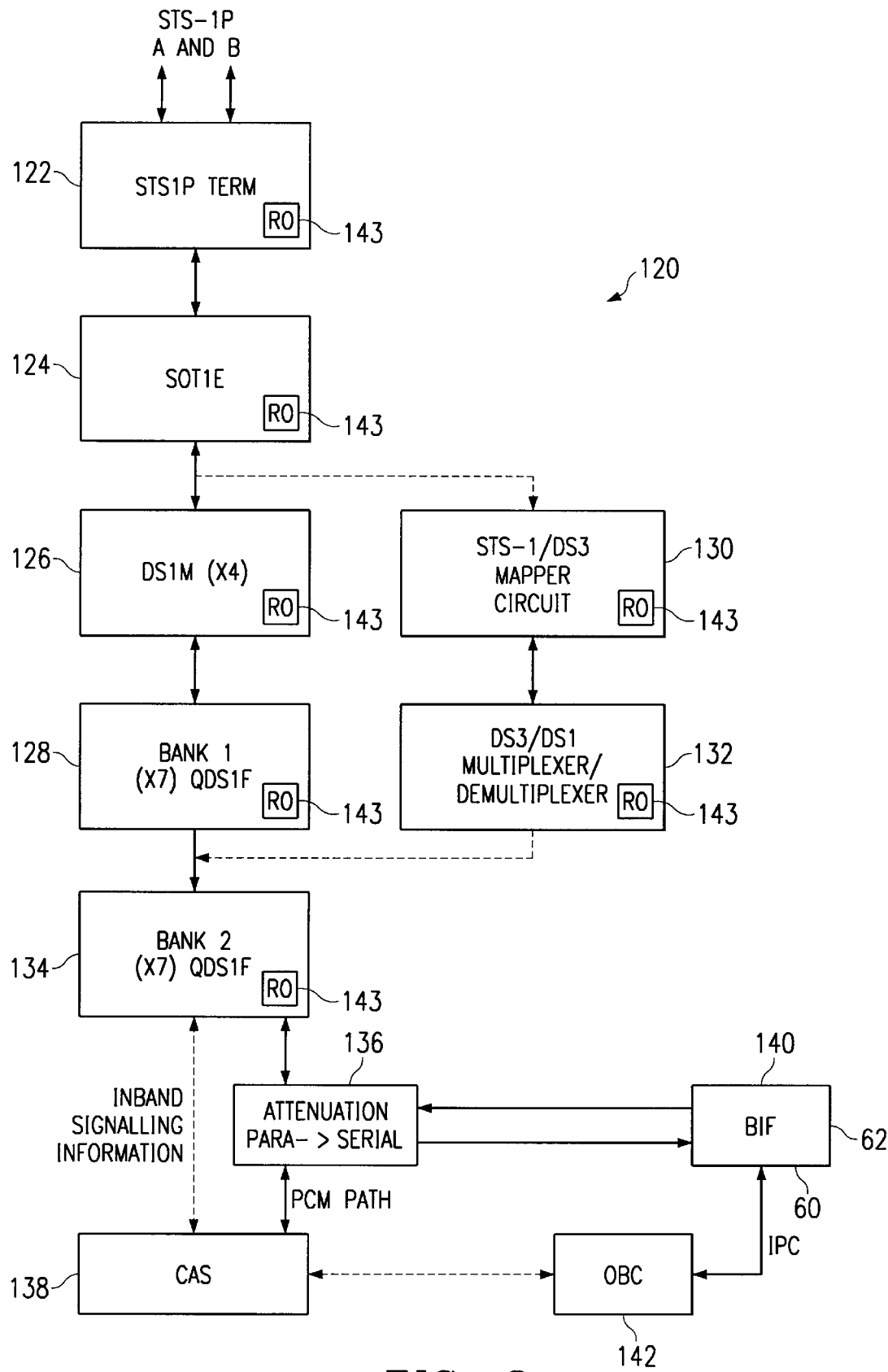
FIG. 3 is a block diagram of an STS-1 interface circuit for use with a switch having an optical interface, embodying concepts of the present invention.

FIG. 3 is a block diagram of an STS-1 interface circuit 120 for use with a switch having an optical interface, embodying concepts of the present invention. STS-1 interface circuit 120 receives redundant planes of STS-1 data in a synchronous payload envelope data format, and encodes the DS0 data signals that comprise the data carried by the STS-1 data channel onto ingress bus 60. In addition, STS-1 application circuit 120 receives DS0 data channels from egress bus 62 and encodes the data into an STS-1 data channel in a synchronous payload envelope data format for transmission over an optical fiber 18. STS-1 circuit 120 is operable to receive STS-1 data that is further encoded in either a VT1.5 or DS3 data format.

Two redundant planes of telecommunications data signals having an STS-1P synchronous payload envelope format are received at STS-1 application circuit 120 from optical interface circuit 40. STS-1P terminator circuit 122 is a data transceiver that selects one of the two redundant data planes as the primary data plane and transmits the data signals to SONET overhead terminator 1E circuit 124. STS-1P terminator circuit 122 is also operable to transmit outgoing telecommunications data signals received from SONET overhead terminator 1E circuit 124 to optical interface circuit 40 in two redundant data planes.

SONET overhead terminator 1E circuit 124 is a data transceiver that transmits the telecommunications data signals to four DS1M VT1.5 path terminator circuits 126 if the data is also in a VT1.5 data format. Otherwise, SONET overhead terminator 1E circuit 124 transmits the telecommunications data signals to STS-1/DS3 mapper circuit 130 if the data is also in a DS3 data format. SONET overhead terminator 1E circuit 124 is further operable to receive an outgoing telecommunications data signal from either four DS1M VT1.5 path terminator circuits 126 or STS-1/DS3 mapper circuit 130, and to transmit the outgoing telecommunications data signals to STS-1P terminator circuit 122.

For a telecommunications data signal that is received in a VT1.5 data format, the data is transmitted to four DS1M VT1.5 path terminator circuits 126 by SONET overhead terminator 1E circuit 124. Each DS1M VT1.5 terminator circuit 126 is a data transceiver that converts the telecommunications data signal from the synchronous payload envelope format into one or more single VT1.5 format data frames. Each of the four DS1M VT1.5 path terminator circuits 126 is coupled to one or more of the seven bank-1 QDS1F DS1 data framer circuits 128. The four DS1M VT1.5 path terminator circuits are also operable to receive outgoing telecommunications data signals from the seven bank-1 QDS1F DS1 data framer circuits 128 in a VT1.5 format and to convert the outgoing telecommunications data signal into a synchronous payload envelope format.

The seven bank-1 QDS1F DS1 data framer circuits 128 are data transceivers that receive the telecommunications data signal in four VT1.5 format data channels from the four DS1M VT1.5 path terminator circuits 126, and map the telecommunications data signal into seven channels of data in a DS1 data format. The seven channels of DS1 data are then transmitted to the seven bank-2, QDS1F DS1 data framer circuits 134. The seven bank-1 QDS1F DS1 data framer circuits 128 are also operable to receive an outgoing telecommunications data signal from the seven bank-2 QDS1F DS1 data framer circuits 134 in a DS1 data format and to convert the data into four channels having a VT1.5 format.

Alternatively, if the data is received in a DS3 data format, SONET overhead terminator 1E circuit 124 transmits the data to STS1/DS3 mapper circuit 130. STS1/DS3 mapper circuit 130 is a data transceiver that converts the telecommunications data signal from a synchronous payload envelope format into a DS3 data format, which is then transmitted to DS3/DS1 multiplexer/de-multiplexer circuit 132. STS1/DS3 mapper circuit 130 is further operable to receive an outgoing telecommunications data signal from DS3/DS1 multiplexer/de-multiplexer circuit 132 in a DS3 data format, and to convert the outgoing telecommunications data signal into a synchronous payload envelope format for transmission to SONET overhead terminator 1E circuit 124.

DS3/DS1 multiplexer/demultiplexer circuit 132 is a data transceiver that converts the telecommunications data signal from a single DS3 data channel into 28 DS1 data channels. The 28 DS1 data channels are then transmitted to the seven bank-2 QDS1F DS1 data framer circuits 134. DS3/DS1 multiplexer/demultiplexer circuit 132 is also operable to receive an outgoing telecommunications data signal from the seven bank-2 QDS1F data framer circuits 134 in 28 channels having a DS1 data format and to convert the data into a single DS3 data channel for transmission to STS1/DS3 mapper circuit 130.

The seven bank-2 QDS1F DS1 data framer circuits 134 are data transceivers that are operable to convert the telecommunications data signal from 28 DS1 data channels into 672 DS0 data channels, which are then transmitted to attenuation and parallel-to-serial (converter circuit 136. The seven bank-2 QDS1F DS1 data framer circuits 134 are further operable to receive an outgoing telecommunications data signal from attenuation and parallel-to-serial converter circuit 136, to convert the signal from 672 DS0 data channels into 28 DS1 data channels, and to transmit the 28 DS1 data channels to either the DS3/DS1 multiplexer/demultiplexer circuit 132 or the seven bank-1 QDS1F DS1 data framer circuits 128.

Attenuation and parallel-to-serial converter circuit 136 is operable to change the attenuation of each DS0 data channel, such as by referring the signal to a look up table of attenuation values stored in a suitable data memory. Attenuation and parallel-to-serial converter circuit 136 is further operable to convert the 672 parallel DS0 signals into serial data signals. The serial data signals are then transmitted to bus interface circuit 140. Bus interface circuit 140 is coupled to ingress bus 60 and egress bus 62, and transmits the serial data signals over ingress bus 60.

In addition, inband signaling data is extracted from the DS0 data channels by the seven bank-2 QDS1F circuits 134 and is transmitted to channel associated signaler circuit 138. Channel associated signaller circuit 138 is coupled to attenuation and parallel-to-serial converter circuit 136 and onboard controller circuit 142. Channel associated signaller circuit 138 converts any in-band signaling received from the 672 DS0 signals into control data, which is included in the data transmitted over ingress bus 60 through bus interface circuit 140.

Onboard controller circuit 142 is coupled to bus interface circuit 140 and channel associated signaller circuit 138. Onboard controller circuit 142 is operable to receive control data from STS-1 application circuit 120 and to generate control commands in response to control data received. Control commands generated by onboard controller circuit 142 are transmitted via a data bus (not explicitly shown) to components of STS-1 circuit 120, such as STS-1P terminator circuit 122, SONET overhead terminator 1E circuit 124, four DS1M VT1.5 path terminator circuits 126, seven bank-1 QDS1F DS1 data framer circuits 128, STS-1/DS3 mapper circuit 130, DS3/DS1 multiplexer/de-multiplexer circuit 132, seven bank-2 QDS1F DS1 data framer circuits 134, attenuation and parallel-to-serial converter circuit 136, channel associated signaller circuit 138, and bus interface circuit 140. Onboard controller circuit 142 may comprise controller 80 of FIG. 2.

For example, onboard controller circuit 142 may control components of STS-1 application circuit 120 using object oriented programming. Suitable programming objects and agents such as resource objects 143, device driver objects, configuration agents, test agents, and other suitable agents may be used to control the components of STS-1 application circuit 120. These objects and agents are programming code that is implemented on processors such as controller 80 of FIG. 2 and components of STS-1 circuit 120.

For example, STS-1 application circuit 120 may include programmable components that are operable to receive an "STS-1 resource object" code segment from onboard controller 142 via the data bus of STS-1 application circuit 120. The STS-1 resource object code segment may contain data describing all state variables of STS-1 application circuit 120, a change in state of any of the state variables, or operating commands for the components STS-1 application circuit 120. A resource object code segment may be defined such that there can be only one instance of the resource object code segment.

The components of STS-1 application circuit 120 may include programming that is operable to process the data of the STS-1 resource object code segment, such as to determine that the data includes a request for the contents of a data register. This programming may be referred to as an "agent," and may be comprised of sections of interworking and coordinated programming code on distributed processors. The components of STS-1 application circuit 120 may be further operable to encode the data values stored in the data register into a new instance of the STS-1 resource object code segment, and to transmit the STS-1 resource object code segment to onboard controller 142 via the data bus of STS-1 application circuit 120.

Onboard controller circuit 142 is operable to receive data and issue control commands for restoring, removing, and testing the components of STS-1 application circuit 120, monitoring the performance of STS-1 application circuit 120, processing faults conditions of the components of STS-1 application circuit 120, managing ports to STS-1 application circuit 120, processing calls through STS-1 application circuit 120, and to perform other suitable functions.

In addition to an STS-1 resource object code segment, resource object code segments may also be used for components of STS-1 application circuit 120. For example, STS-1P terminator circuit 122, SONET overhead terminator 1E circuit 124, four DS1M VT1.5 path terminator circuits 126, seven bank-1 QDS1F DS1 data framer circuits 128, STS-1/DS3 mapper circuit 130, DS3/DS1 multiplexer/de-multiplexer circuit 132, and seven bank-2 QDS1F DS1 data framer circuits 134 may each have associated resource object code segments that describe all relevant state variables, a change in state of any of the state variables, or operating commands for the components. Programming contained within onboard controller circuit 142 and the components of STS-1 application circuit 120 is operable to generate appropriate commands responsive to these resource objects.

In addition, programming contained within onboard controller circuit 142 is operable to perform performance monitoring functions, respond to fault conditions, perform testing functions, control ports, perform call processing, and control resource object control functions. Onboard controller circuit 142 may comprise a single circuit card for use in a data transmission system, with plug-in connectors that allow the card to be easily installed and removed. Alternatively, onboard controller circuit 142 may be configured as a single circuit card for use in an optical fiber termination module for interfacing with a telecommunications switch, with plug-in connectors that allow the card to be easily installed and removed.

Figure 4:
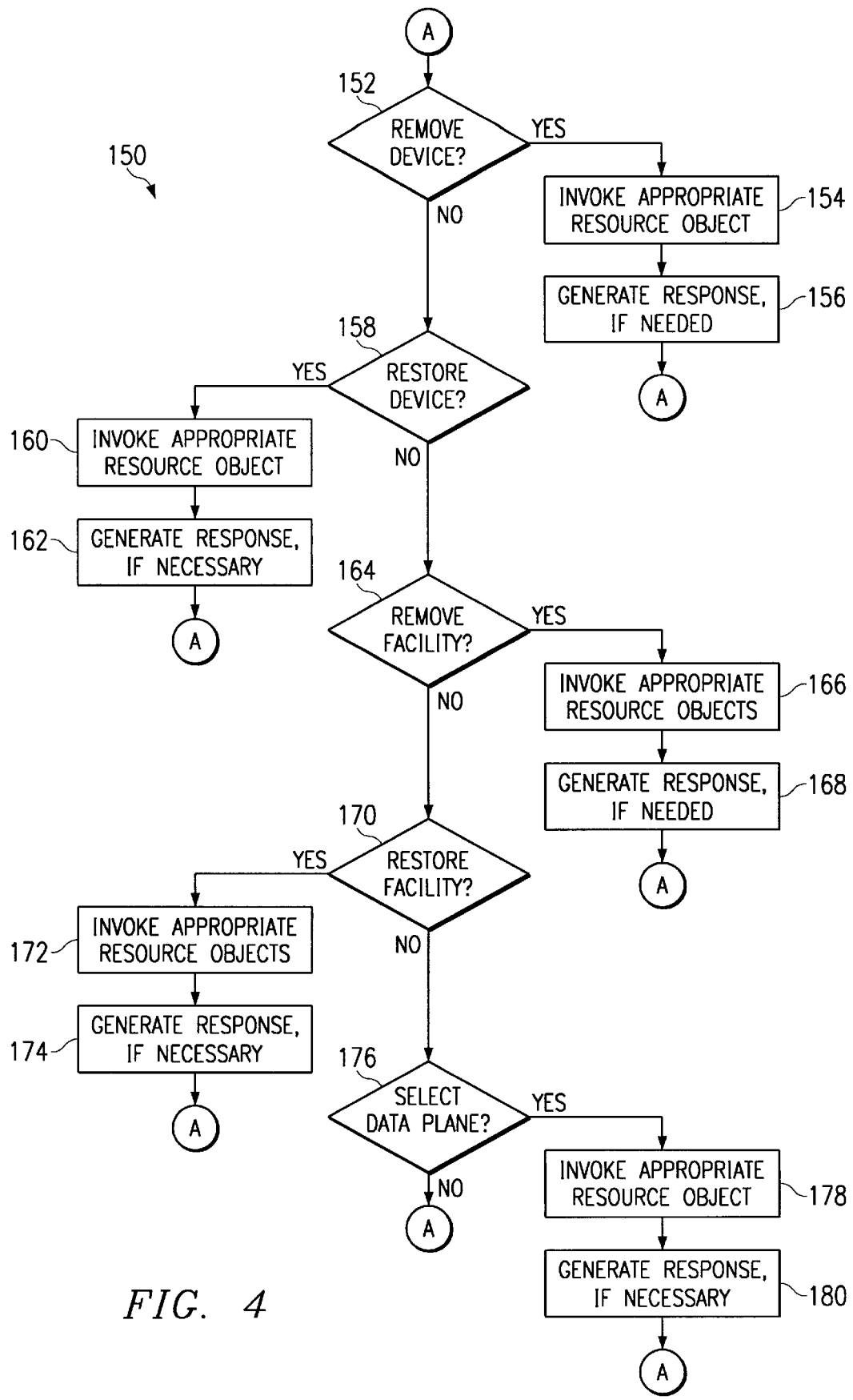
FIG. 4 is a flowchart of a method for configuring an STS-1 application circuit embodying concepts of the present invention.

FIG. 4 is a flowchart of a method 150 for configuring an STS-1 application circuit embodying concepts of the present invention. Method 150 may be used in conjunction with onboard controller 142 of FIG. 3.

Method 150 begins at step 152, where it is determined whether a remove device message has been received. For example, a remove device message may be generated by a component of STS-1 application circuit 120 if performance monitoring equipment determines that STS-1 application circuit 120 is malfunctioning or needs to be tested. If a remove device message device has been received, the method proceeds to step 154 where an appropriate resource object code segment is invoked. In addition, any devices downstream of the selected device will also be removed, if a appropriate.

For example, if the STS-1 application circuit 120 device is chosen to be removed, the DS3 circuit represented by STS-1/DS3 mapper circuit 130 and DS3/DS1 multiplexer/demultiplexer circuit 132 or the VT1.5 circuit represented by four DS1M VT1.5 path terminator circuits 126 and seven bank-1 QDS1F DS1 data framer circuits 128 will also be removed. These additional devices may be removed by any appropriate method, such as by invoking an appropriate resource object code segment from a configuration agent, or from a resource object code segment of a intervening device.

As previously described, invoking a resource object code segment is a method by which to accomplish a predetermined task. Thus, other suitable methods may be used to remove a device besides invoking a resource object code segment. Nevertheless, these me hods must provide the same level of command flexibility, processing speed, and operational reliability as object-oriented programming methods.

After the appropriate resource object code segment has been invoked at step 154 to remove the device, the method proceeds to step 156. At step 156, any required response is generated. For example, if a device is removed in response to a command generated by a process of a performance monitoring or fault agent, a response may be needed in order to terminate the process of the performance monitoring or fault agent. After the response is generated if required, the method returns to the beginning of method 150. Alternatively, if distributed processing capability is utilized, the method may return to the beginning of method 150 simultaneously with generation of a response at step 156.

If a remove device message has not been received at step 152, the method proceeds to step 158 where it is determined whether a restore device message has been received. Alternatively, if distributed processing capability is utilized, the method may proceed to step 158 simultaneously with the performance of other method steps. If a restore device message has been received at step 158, the method proceeds to step 160. At step 160, an appropriate resource object code segment is invoked to restore the selected device. In addition, any devices downstream of the selected device will also be restored, if a appropriate.

For example, if the STS-1 application circuit 120 device is chosen to be restored, the DS3 circuit represented by STS-1/DS3 mapper circuit 130 and DS3/DS1 multiplexer/de-multiplexer circuit 132 or the VT1.5 circuit represented by four DS1M VT1.5 path terminator circuits 126 and seven bank-1 QDS1F DS1 data framer circuits 128 will also be restored. These additional devices may be restored by any appropriate method, such as by invoking an appropriate resource object code segment from a configuration agent, from a resource object code segment of a intervening device, or other suitable methods that do not utilize object-oriented programming.

After an appropriate resource object has been invoked at step 160, the method proceeds to step 162. At step 162, any required responses are generated. For example, a status message may be required after a device has been restored to verify that the restored device is operable. After all necessary responses have been generated at step 162, the method returns to the beginning of 150. As previously noted, the method may return to the beginning of method 150 simultaneously with generation of a response at step 156 if distributed processing is utilized.

If a restore device message has not been received at step 158, the method proceeds to step 164, where it is determined whether a remove facility message has been received. If a remove facility message has been received at step 164, the method proceeds to step 166. At step 166, the appropriate resource object code segments are invoked in order to remove the facility.

For example, a device is comprised of one or more facilities. STS-1 application circuit 120 is comprised of the following facilities: STS-1P terminator circuit 122, SONET overhead terminator 1E circuit 124, four DS1M VT1.5 path terminator circuits 126, seven bank-1 QDS1F DS1 data framer circuits 128, STS-1/DS3 mapper circuit 130, DS3/DS1 multiplexer/de-multiplexer circuit 132, and seven bank-2 QDS1F DS1 data framer circuits 134. In addition, some of these facilities are "downstream" from other facilities, such that the downstream facilities will not operate properly unless the upstream facilities are operable.

For example, one bank-2 QDS1F DS1 data framer circuit 134 may be downstream from one bank-1 QDS1F data framer circuit 128. If the bank-1 QDS1F circuit 128 is removed, it is also necessary to remove the corresponding downstream bank-2 QDS1F circuit 132. The downstream bank-2 QDS1F circuit 132 may be removed by a suitable method, such as by simultaneous or sequential generation of a suitable resource object code segment.

After the appropriate resource object code segments have been invoked at step 166, the method proceeds to step 168. At step 168, a response is generated if required. For example, the remove facility message may have been generated by a configuration, performance monitoring, or test agent that requires a response in order to close out a monitoring function. After the response is generated at step 168, the method returns to beginning of method 150.

If a remove facility message is not received at step 164, the method proceeds to step 170. At step 170 it is determined whether a restore facility message has been received. If a restore facility message is received at step 170, the method proceeds to step 172.

Step 172, an appropriate resource object code segment or other suitable method is invoked to restore the facility. As previously described, the restore facility command is propagated through all subordinated facilities. For example, if a bank-1 QDS1F data framer circuit 128 is restored, resource object code segments are generated to restore the corresponding downstream bank-2 QDS1F DS1 data framer circuit 134. After appropriate resource object code segments or other suitable methods have been invoked at step 172, the method proceeds to step 174. At step 174, any required responses are generated. The method then returns to the beginning of method 150.

If a restore facility message is not received at step 170, the method proceeds to step 176 where it is determined whether a select data plane message has been received. If the select data plane message has been received, the method proceeds to step 178. At step 178, appropriate resource object code segments are invoked in order to select a data plane. For example, circuit 120 may be comprised or redundant plane A and plane B components carrying redundant data channels. Where suitable, these planes may be changed. For example, if a fault occurs on the current active plane, the current active plane may be taken out service and replaced with the redundant plane. In addition, individual components of each redundant plane may be used thus allowing the system to continue functioning after the occurrence of multiple failures.

After a select data plane message is received a step 176, the method proceeds to step 178 where appropriate resource object code segments or other suitable methods are invoked. The method then proceeds to step 180, where any responses that are necessary are generated. For example, a fault agent or performance monitoring agent may require the generation of a response in order to close out routines that generated the select data plane message. After any required response messages are generated at step 180, the method returns to beginning of method 150. Likewise, if a select data plane message is not generated at step 176, the method returns to the beginning of method 150.

Method 150 may be implemented by object oriented programming or other suitable methods. For example, object oriented programming may be used at steps 152, 158, 164, 170, and 176 to allow each the tests identified at those blocks to be operated in parallel. As noted, other suitable methods or combinations of methods may be used to implement method 150.

Figure 5:
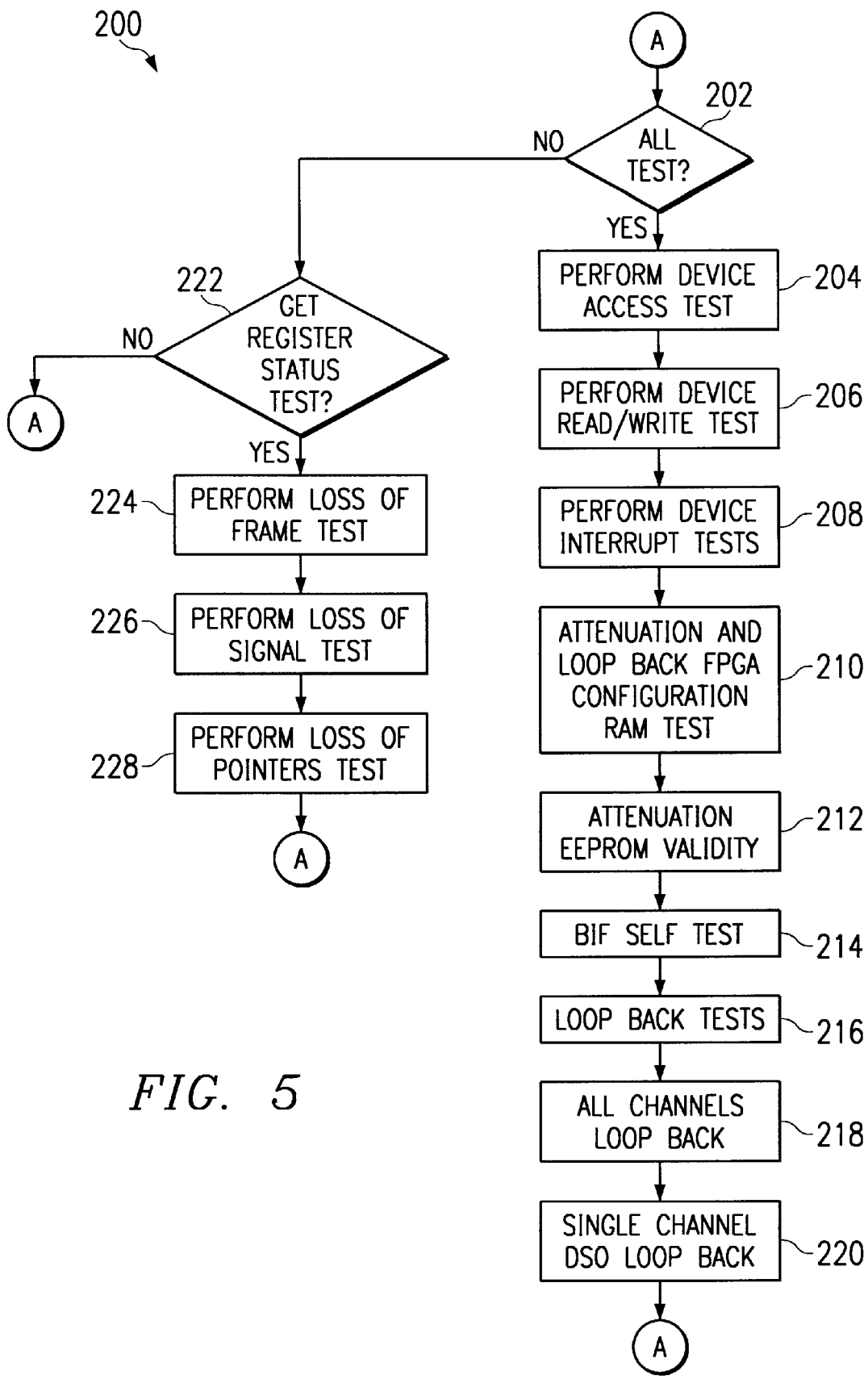
FIG. 5 is a flowchart of a method for controlling test functions embodying concepts of the present invention.

FIG. 5 is a flowchart of a method for controlling test functions 200 embodying concepts of the present invention. Method 200 may be coordinated through a local test agent operating on onboard controller circuit 142, or through a distributed test agent operating on onboard controller circuit 142 and other components of STS-1 application circuit 120 of FIG. 3.

Method 200 begins at step 202 there it is determined whether an all test message has been received. If an all test message has been received, the method proceeds to step 204. At step 204, a device access test is performed. For example, a device access test may be performed by generating one or more appropriate test object code segments from a test agent. A device access test object code segment may contain predetermined data that causes predetermined tests to be performed by the device.

For example, STS-1P terminator circuit 122 may include programmable components that are operable to receive one or more device access test object code segments from onboard controller 142 via the data bus of STS-1 application circuit 120. The one or more device access test object code segments may contain data for performing a read access test to a specific register to verity that the device can be addressed correctly. Components of STS-1P terminator circuit 122 may include programming that is operable to process the data of the device access test object code segment. The components of STS-1P terminator circuit 122 may be further operable to encode the data values stored in the data register into the device access test object code segment, and to transmit the device access test object code segment to onboard controller 142 via the data bus of STS-1 application circuit 120. The method then proceeds to step 206.

At step 206, a device read-write test is performed. For example, one or more read-write test object code segments may be generated for a device to determine whether a component of STS-1 application circuit 120 reads and writes data to predetermined registers. This test may require the component to generate a read-write test object code segment, which will be received by the test agent and verified for an appropriate response. The method then proceeds to step 208.

At step 208, a device interrupt test is performed. For example, one or more device interrupt test object code segments may be transmitted from onboard controller circuit 142 over the data bus of STS-1 application circuit 120 to predetermined components of STS-1 application circuit 120. The components of STS-1 application circuit 120 may then generate interrupts that are transmitted to the onboard controller circuit 142. The interrupts may be received by the test agent and verified for an appropriate response. The method then proceeds to step 210.

At step 210, an attenuation and loop back FPGA configuration ram test is performed. One or more attenuation test object code segments are generated by the test agent that causes the erasable, programmable read-only memory content of attenuation and parallel-to-serial converter circuit 136 to be verified. Each attenuation setting and all conversion processes that are performed by attenuation and parallel-to-serial converter circuit 136 is verified. The test agent is operable to monitor any responses for appropriate responses. The method then proceeds to step 214.

At step 214, a bus interface self test is performed. The test agent generates a bus interface self test object data segment that is transmitted to bus interface circuit 140 of STS-1 application circuit 120. Data generated by bus interface circuit 140 is monitored by the test agent to verify that a predetermined response has been generated. The method proceeds to step 216.

At step 216 a loopback test is performed by a suitable method, such as by generating one or more loopback test object code segments with the test agent. Multiple loopback tests are performed starting from the seven bank-2 QDS1F DS1 data framer circuits 134 and working towards the STS1 path terminator circuit 122. A pseudo-random binary sequence analyzer/generator in the seven bank-2 QDS1F DS1 data framer circuits 134 can be used for loopback verification. Furthermore, framer slip buffers are used for loopback verification. The following loopback tests may also be performed to isolate problems to a specific device: a DS1 local loopback at the seven bank-1 QDS1F DS1 data framer circuits 134, a DS3 line loopback at the seven bank-2 QDS1F DS1 data framer circuits 132, an STS-1 loopback at STS-1/DS3 mapper circuit 130, an STS-1 and path termination loopback at SONET overhead terminator 1E circuit 124, and an STS1-P and path termination loopback at STS1 path terminator circuit 122. The method then proceeds to step 218.

At step 218, an all channels loopback test is performed. For example, DS0 PCM samples may be routed by the test agent through the attenuation and loopback FPGA for each DS1 interface by generating a suitable all channels loopback object code segment and transmitting the all channels loopback object code segment over the data bus of STS-1 application circuit 120. The same test is performed at bus interface circuit 140 by looping all ingress data to the egress data bus. The method then proceeds to step 220.

At step 220, a single channel DS0 loopback test is performed. One or more single channel loopback test object code segments are used to route DS0 pulse code modulated data through the attenuation and loopback FPGA for each of the seven bank-2 QDS1F data framer circuits 134 and seven bank-1 QDS1F DS1 data framer circuits 128. The transmit and receive slip buffers in the DS1 framers are used to verify loopback.

If an all test message is not received at step 202, the method proceeds to step 222. At step 222, it is determined whether a get register status test message has been received. If a get register status test message has been received at step 222, the method proceeds to step 224.

At step 224, a loss of frame test is performed on the STS1, DS3, and DS1 facilities. Suitable test object code segments may be generated by the test agent and transmitted to the STS1, DS3, and DS1 facilities of STS-1 application circuit 120. When STS-1 application circuit 120 is in service, the test agent runs all tests as low priority. In this manner, call processing time is not directly affected. If the test fails at any point, it is terminated and a status is returned indicating the error type to the onboard controller circuit 142.

After performance of the loss of frame test at step 224, the method proceeds to step 226. At step 226 a loss of signal test is performed. Predetermined test object code segments are generated by the test agent of STS-1 application circuit 120. The method then proceeds to step 228 where a loss of pointers test is performed. Resource object code segments provide the necessary methods to retrieve the current status of the above facilities. The proper statuses are then returned to the unit controller. The method then returns to the beginning of method 200.

In addition to the method steps described in FIG. 4 and FIG. 5, additional control functions may be performed by onboard controller circuit 142 of FIG. 3. Performance monitoring may be performed for any systems or components of STS-1 application circuit 120 by generating an object code segment that includes a command for retrieving the contents of one or more data registers containing performance data. Fault conditions for any of the components or systems of STS-1 application circuit 120 may be monitored or processed by generating an object code segment, in response to a fault notification message, that requests the content of fault data registers or that contains commands that reset faulted components.

Likewise, port management may be performed by onboard controller circuit 142 by generating an object code segment that changes the status of a port or of data in data registers pertaining to a port. Call processing functions may be performed by generating an object code segment that contains call processing commands and transmitting those commands to predetermined components or systems of STS-1 application circuit 120. The advantages of using object oriented programming in a distributed processing environment for these tasks is that onboard controller 142 may perform other processing activities after transmitting an object code segment, and does not need to sit idle while waiting for a response from a system or component of STS-1 application circuit 120.

In operation, onboard controller circuit 142 of STS-1 application circuit 120 of FIG. 3 processes operating commands to control the operation of components of STS-1 application circuit 120. Onboard controller circuit 142 uses object-oriented programming to increase the speed and reliability of control of STS-1 application circuit 120. Onboard controller 142 may remove components from service, restore components to service, respond to faults, monitor performance, control port operation, perform call processing, test components, and perform other suitable control activities for STS-1 application circuit 120.

The present invention provides many important technical advantages. One important technical advantage of the present invention is a system for controlling a telecommunications system component that increases the speed and reliability of control for the component. Another important technical advantage of the present invention is a method for controlling a telecommunications system component that increases the speed and reliability of control for the component.

Although several embodiments of the present invention and its advantages have been described in detail, it should be understood that mutations, changes, substitutions, transformations, modifications, variations, and alterations can be made therein without departing from the teachings of the present invention, the spirit and scope of the invention being set forth by the appended claims.

What is claimed is:

1. A system for controlling a telecommunications component, the system comprising:

a first data format transceiver operable to convert data from a first data format to a second data format and data from the second data format to the first data format, the first data format transceiver including a first resource object, the first resource object having predetermined data related to state variables and operating commands associated with the first data format transceiver;

a second data format transceiver operable to convert data from a third data format to the second data format and data from the second data format to the third data format, the second data format transceiver including a second resource object having predetermined data related to state variables and operating commands associated with the second data format transceiver;

a controller coupled to the first data format transceiver and the second data format transceiver, the controller operable to change the predetermined data of the first resource object and the predetermined data of the second resource object in order to change the state variables, a state of any state variable, and the operating commands associated with the first and second data format transceivers; and a bank data format transceiver operable to convert data from the second data format to a fifth data format and from the fifth data format to the second data format, the bank data format transceiver including a fourth resource object having predetermined data related to the bank data format transceiver the controller operable to change the predetermined data of the bank resource object in order to change the state variables, a state of any state variable, and the operating commands associated with the bank data format transceiver.

2. The system of claim 1 wherein the first data format transceiver resource object is a DS3 data format transceiver resource object, the first data format is a DS3 data format, and the second data format is a DS1 data format.

3. The system of claim 1 wherein the second data format transceiver resource object is a VT1.5 data format transceiver resource object, the third data format is a VT1.5 data format, and the second data format is a DS1 data format.

4. The system of claim 1 further comprising:
a third data format transceiver operable to convert data from a fourth data format to the first data format and the third data format and data from the first data format and the third data format to the fourth data format, the third data format transceiver including a third resource object having predetermined data related to state variables and operating commands associated with the third data format transceiver, the controller operable to change the predetermined data of the third resource object in order to change the state variables, a state of any state variable, and the operating commands associated with the third data format transceiver.

5. The system of claim 4 wherein the third resource object is an STS-1P resource object, the fourth data format is an STS-1P data format, the first data format is a DS3 data format, and the third data format is a VT1.5 data format.

6. The system of claim 1 further comprising a plurality of second data format transceivers that each convert data from the third data format to the second data format and convert data from the second data format to the third data format, each second data format transceiver including an associated second resource object having predetermined data related to its associated second data format transceiver.

7. The system of claim 1 wherein the fifth data format is a DS0 data format and the second data format is a DS1 data format.

8. The system of claim 1 further comprising a plurality of bank data format transceivers that each convert data from the second data format to a fifth data format and data from the fifth data format to the second data format, each bank data format transceiver including an associated bank resource object having predetermined data related to state variables and operating commands for its associated bank data format transceiver the controller operable to change the predetermined data of each of the bank resource objects in order to change the state variables, a state of any state variable, and the operating commands associated with its bank data format transceiver.

9. The system of claim 1 wherein the controller further comprises a configuration agent that processes a remove device command that causes each data format transceiver to be removed from service.

10. The system of claim 1 wherein the controller further comprises a configuration agent that processes a restore device command that causes each data format transceiver to be restored to service.

11. The system of claim 1 wherein the controller further comprises a configuration agent that processes a remove facility command that will cause one or more predetermined data format transceivers to be removed from service.

12. The system of claim 1 wherein the controller further comprises a configuration agent that processes a restore facility command that will cause one or more predetermined data format transceivers to be restored to service.

13. The system of claim 1 wherein the controller further comprises a configuration agent that processes a select data plane command that will cause one of two redundant data channels to be transmitted to the first data format transceiver and the second data format transceiver.

14. The system of claim 1 wherein the controller further comprises a test agent that processes a device access test command that will cause one or more device access test commands to be transmitted to the first data format transceiver and the second data format transceiver.

15. The system of claim 1 wherein the controller further comprises a test agent that processes a get register status test command that will cause one or more register status test commands to he transmitted to the first data format transceiver and the second data format transceiver.

16. A system for controlling a telecommunications component, the system comprising:
a first data format transceiver control system operable to transmit predetermined data to and receive predetermined data from a first data format transceiver that is operable to convert data from a first data format to a second data format and to convert data from the second data format to the first data format, the predetermined data of the first data format transceiver control system being related to state variables and operating commands associated with the first data format transceiver;
a second data format transceiver control system operable to transmit predetermined data to and receive predetermined data from a second data format transceiver that is operable to convert data from a third data format to the second data format and to convert data from the second data format to the third data format, the predetermined data of the second data format transceiver control system being related to state variables and operating commands associated with the second data format transceiver;
a controller coupled to the first data format transceiver control system and the second data format transceiver control system, the controller operable to change the predetermined data of the first data format transceiver control system and the predetermined data of the second data format transceiver control system in order to change the state variables, a state of any state variable, and the operating commands associated with the first and second data format transceivers; and
a bank data format transceiver control system operable to transmit predetermined data to and receive predetermined data from a bank data format transceiver that is operable to convert data from the second data format to a fifth data format and to convert data from the fifth data format to the second data format, the predetermined data of the bank data format transceiver control system being related to state variables and operating commands associated with the bank data format transceiver, the controller operable to change the predetermined data of the bank resource object in order to change the state variables, a state of any state variable, and the operating commands associated with the bank data format transceiver.

17. The system of claim 16 wherein the first data format transceiver control system is a DS3 data format transceiver control system, the first data format is a DS3 data format, and the second data format is a DS1 data format.

18. The system of claim 16 wherein the second data format transceiver control system is a VT1.5 data format transceiver control system, the third data format is a VT1.5 data format, and the second data format is a DS1 data format.

19. The system of claim 16 further comprising a third data format transceiver control system operable to transmit predetermined data to and receive predetermined data from a third data format transceiver that is operable to convert data from a fourth data format to the first data format and the third data format and to convert data from the first data format and the third data format to the fourth data format, the predetermined data of the third data format transceiver control system being related to state variables and operating commands associated with the third data format transceiver, the controller operable to change the predetermined data of the third resource object in order to change the state variables, a state of any state variable, and the operating commands associated with the third data format transceiver.

20. The system of claim 19 wherein the third data format transceiver control system is an STS-1P data format transceiver control system, the fourth data format is an STS-1P data format, the first data format is a DS3 data format, and the third data format is a VT1.5 data format.

21. The system of claim 16 further comprising a plurality of second data format transceiver control systems, each second data format transceiver control system operable to transmit predetermined data to and to receive predetermined data from a one of a plurality of second data format transceivers that are each operable to convert data from a third data format to the second data format and to convert data from the second data format to the third data format.

22. The system of claim 16 wherein the fifth data format is a DS0 data format and the second data format is a DS1 data format.

23. The system of claim 16 further comprising a plurality of bank data format transceiver control systems, each bank data format transceiver control system operable to transmit predetermined data to and receive predetermined data from one of a plurality of bank data format transceivers that are each operable to convert data from the second data format to a fifth data format and to convert data from the fifth data format to the second data format.

24. The system of claim 16 wherein the controller further comprises a configuration system operable to process a remove device command that will cause each data format transceiver to be removed from service.

25. The system of claim 16 wherein the controller further comprises a configuration system operable to process a restore device command that will cause each data format transceiver to be restored to service.

26. The system of claim 16 wherein the controller further comprises a configuration system operable to process a remove facility command that will cause one or more predetermined data format transceivers to be removed from service.

27. The system of claim 16 wherein the controller further comprises a configuration system operable to process a restore facility command that will cause one or more predetermined data format transceivers to be restored to service.

28. The system of claim 16 wherein the controller further comprises a configuration system operable to process a select data plane command that will cause one of two redundant data channels to be transmitted to the first data format transceiver and the second data format transceiver.

29. The system of claim 16 wherein the controller further comprises a test system operable to process a device access test command that will cause one or more device access test commands to be transmitted to the first data format transceiver and the second data format transceiver.

30. The system of claim 16 wherein the controller further comprises a test system operable to process a get register status test command that will cause one or more register status test commands to be transmitted to the first data format transceiver and the second data format transceiver.

* * * * *